United States Patent
Brantingham et al.

(10) Patent No.: US 12,155,137 B2
(45) Date of Patent: Nov. 26, 2024

(54) ELECTRICAL TERMINAL WITH CONNECTION TO FLEXIBLE CIRCUIT CONDUCTOR

(71) Applicant: APTIV TECHNOLOGIES LIMITED, St. Michael (BB)

(72) Inventors: Duane L Brantingham, Cortland, OH (US); David R. Peterson, Aurora, OH (US); Jared Bilas, North Bloomfield, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 200 days.

(21) Appl. No.: 17/559,376

(22) Filed: Dec. 22, 2021

(65) Prior Publication Data
US 2022/0407251 A1  Dec. 22, 2022

Related U.S. Application Data

(60) Provisional application No. 63/211,265, filed on Jun. 16, 2021.

(51) Int. Cl.
| | | |
|---|---|---|
| *H01R 12/00* | (2006.01) | |
| *B60R 16/02* | (2006.01) | |
| *H01R 12/59* | (2011.01) | |
| *H01R 12/67* | (2011.01) | |
| *H01R 12/70* | (2011.01) | |
| *H01R 43/02* | (2006.01) | |
| *H01R 13/10* | (2006.01) | |

(52) U.S. Cl.
CPC ........... *H01R 12/592* (2013.01); *B60R 16/02* (2013.01); *H01R 12/67* (2013.01); *H01R 12/7029* (2013.01); *H01R 43/0221* (2013.01); *H01R 43/0256* (2013.01); *H01R 13/10* (2013.01); *H01R 2201/26* (2013.01)

(58) Field of Classification Search
CPC .... H01R 12/592; H01R 12/61; H01R 12/777; H01R 12/778; H01R 24/86
See application file for complete search history.

(56) References Cited

U.S. PATENT DOCUMENTS

| | | | |
|---|---|---|---|
| 3,253,248 A | 5/1966 | Brown | |
| 11,152,752 B2 * | 10/2021 | Amini | H01R 12/592 |
| 2012/0315776 A1 | 12/2012 | Liang | |

FOREIGN PATENT DOCUMENTS

| | | |
|---|---|---|
| EP | 1734621 B1 | 12/2006 |
| EP | 3846291 A1 | 7/2021 |

OTHER PUBLICATIONS

Communication issued by the EPO for EP22179132.0 dated Apr. 5, 2023, 10 pages.

* cited by examiner

*Primary Examiner* — Phuong Chi Thi Nguyen
(74) *Attorney, Agent, or Firm* — Miller Johnson

(57) ABSTRACT

Systems and methods for an electrical connector (e.g., of a vehicle) include a housing and a terminal at least partially disposed in the housing, defining a set of angled blade terminals, and configured to electrically connect to (i) an electrical system along a first axis and (ii) a set of exposed conductive circuit traces of a flexible circuit (FC) arranged along a second axis, wherein an acute angle is defined between the first and second axes and corresponds to the set of angled blade terminals.

21 Claims, 9 Drawing Sheets

ELECTRICAL TERMINAL WITH CONNECTION TO FLEXIBLE CIRCUIT CONDUCTOR

CROSS-REFERENCE TO RELATED APPLICATION(S)

The present application claims the benefit of United States Provisional Application No. 63/211,265, filed on Jun. 16, 2021. The disclosure of the above-identified application is incorporated herein by reference in its entirety.

FIELD

The present application generally relates to electrical connectors and, more particularly, to systems and methods for an electrical terminal with connection to a flexible circuit (FC) conductor.

BACKGROUND

Electrical systems, such as vehicle electrical systems, can include different types of wiring electrically connected via electrical connectors. One example electrical system comprises a set of one or more round wires that are electrically connected via an electrical connector to a set of one or more conductive circuit traces of a flexible circuit (FC), such as a flexible printed circuit (FPC). Conventional electrical connectors for electrically connecting the round wire(s) to conductive circuit trace(s) of an FC utilize a perpendicular arrangement. While suitable for some applications, this perpendicular arrangement can create packaging/space issues for other applications. Thus, while these conventional electrical connectors do work well for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an electrical connector is presented. In one exemplary implementation, the electrical connector comprises a housing and a terminal at least partially disposed in the housing, defining a set of angled blade terminals, and configured to electrically connect to (i) an electrical system along a first axis and (ii) a set of exposed conductive circuit traces of a flexible circuit (FC) arranged along a second axis, wherein an acute angle is defined between the first and second axes and corresponds to the set of angled blade terminals.

In some implementations, the set of angled blade terminals are welded to the set of exposed conductive circuit traces via a welding process to form the electrical connection therebetween. In some implementations, the welding process is laser welding. In some implementations, each angled blade terminal comprises a set of nibs that electrically contact a respective exposed conductive circuit trace. In some implementations, the sets of nibs are formed of a welding material utilized in the welding process.

In some implementations, each angled blade terminal defines a larger surface area for electrical contact with a respective exposed conductive circuit trace compared to a perpendicular connection. In some implementations, the acute angle provides for a low-profile installation arrangement of the electrical system, the electrical connector, and the FC. In some implementations, the electrical system is a set of round wires or an electrical device comprising the set of round wires. In some implementations, the electrical system, the electrical connector, and the FC are all part of a vehicle electrical system.

According to another aspect of the present disclosure, an electrical connection method is presented. In one exemplary implementation, the method comprises providing a housing, providing a terminal at least partially disposed in the housing, the terminal defining a set of angled blade terminals and being configured to electrically connect to (i) an electrical system along a first axis and (ii) a set of exposed conductive circuit traces of an FC arranged along a second axis, wherein an acute angle is defined between the first and second axes and corresponds to the set of angled blade terminals, electrically connecting the set of angled blade terminals to the set of exposed conductive circuit traces of the FC, and electrically connecting an opposing end of the terminal to the electrical system.

In some implementations, electrically connecting the set of angled blade terminals to the set of exposed conductive circuit traces comprises welding the set of angled blade terminals to the set of exposed conductive circuit traces via a welding process to form the electrical connection therebetween. In some implementations, the welding process is laser welding. In some implementations, each angled blade terminal comprises a set of nibs that electrically contact a respective exposed conductive circuit trace. In some implementations, the sets of nibs are formed of a welding material utilized in the welding process.

In some implementations, each angled blade terminal defines a larger surface area for electrical contact with a respective exposed conductive circuit trace compared to a perpendicular connection. In some implementations, the acute angle provides for a low-profile installation arrangement of the electrical system, the electrical connector, and the FC. In some implementations, the electrical system is a set of round wires or an electrical device comprising the set of round wires. In some implementations, the electrical system, the electrical connector, and the FC are all part of a vehicle electrical system.

According to yet another aspect of the present disclosure, an electrical system of a vehicle is presented. In one exemplary implementation, the electrical system comprises an electrical device having a set of three round wires arranged along a first axis, an FC arranged along a second axis and comprising a set of conductive circuit traces disposed within an insulation layer, wherein at least a portion of the insulation layer has been removed thereby providing a set of exposed conductive circuit traces, and a terminal at least partially disposed in a housing, defining a first and a second opposing end forming a set of angled blade terminals, and configured to electrically connect to the set of three round wires of the electrical device and the set of exposed conductive circuit traces of the FC, wherein an acute angle is defined between the first and second axes and corresponds to the set of angled blade terminals.

In some implementations, the electrical device is a vehicle sensor or actuator and wherein the set of three round wires correspond to ground, power, and signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously discussed, conventional electrical connectors for electrically connecting an electrical system (e.g., round wire(s) or an electrical device) to exposed conductive circuit trace(s) of a flexible circuit (FC) utilize a perpendicular arrangement, which is not ideal for some applications as it can create packaging/space issues. Accordingly, an improved electrical connector and electrical connection method and a vehicle electrical system are presented herein. The electrical connector comprises a terminal at least partially disposed in a housing and configured to electrically connect to an electrical system (round wire(s), an electrical device, etc.) at one end and defining a set of angled blade terminals at an opposing end configured to electrically connect to a set of exposed conductive circuit trace(s) of an FC. The angled arrangement is an acute angle that provides for a low-profile connection and installation arrangement of the various components. A vehicle electrical system can comprise all of these components (e.g., the electrical device could be a sensor or actuator of the vehicle). The proposed systems and methods generally involve the use of a unique terminal, connector, and FC design.

This terminal design can allow the use of a shorter terminal length (with a new connector design) due to the conductor attachment method and orientation in the connector. The terminal design allows for a minimum centerline spacing due to the fact that the terminal weld pad is limited to the thickness of the terminal base or a minimum amount of terminal surface area. Also, the terminal is designed to be automatically secured into a plastic connector/wafer thereby facilitating an automatic welding process. The terminals can also be pre-inserted into the plastic connector/wafer to facilitate these automatic processes. Protrusions of varying shape, size, and quantity can be designed into the terminal weld end allowing the terminal to be registered in the correct position relative to the FC and these protrusion(s) can provide a sufficient or excess amount of base material to improve welding repeatability. The connector/terminal orientation is also unique in allowing simplified welding tooling access in vehicle packaging and provides a longer terminal surface (to FC) welding area. For sealed connections, sealing may be accomplished using adhesive pads and/or silicone seals dependent upon associated economics. The FC could also be designed to have corresponding registering feature(s) (holes, slots, etc.) allowing the terminal to fit into position. The connector and the FC may also have complimenting features to assist with correct position/alignment considering manual/semi-automatic/automatic processing. Further, the connector may have various feature(s) that facilitate ease of registering sealing pads/seals/components. Lastly, the bottom cap/sealing cap may require features that separate FC conductive traces.

Figure 1A:
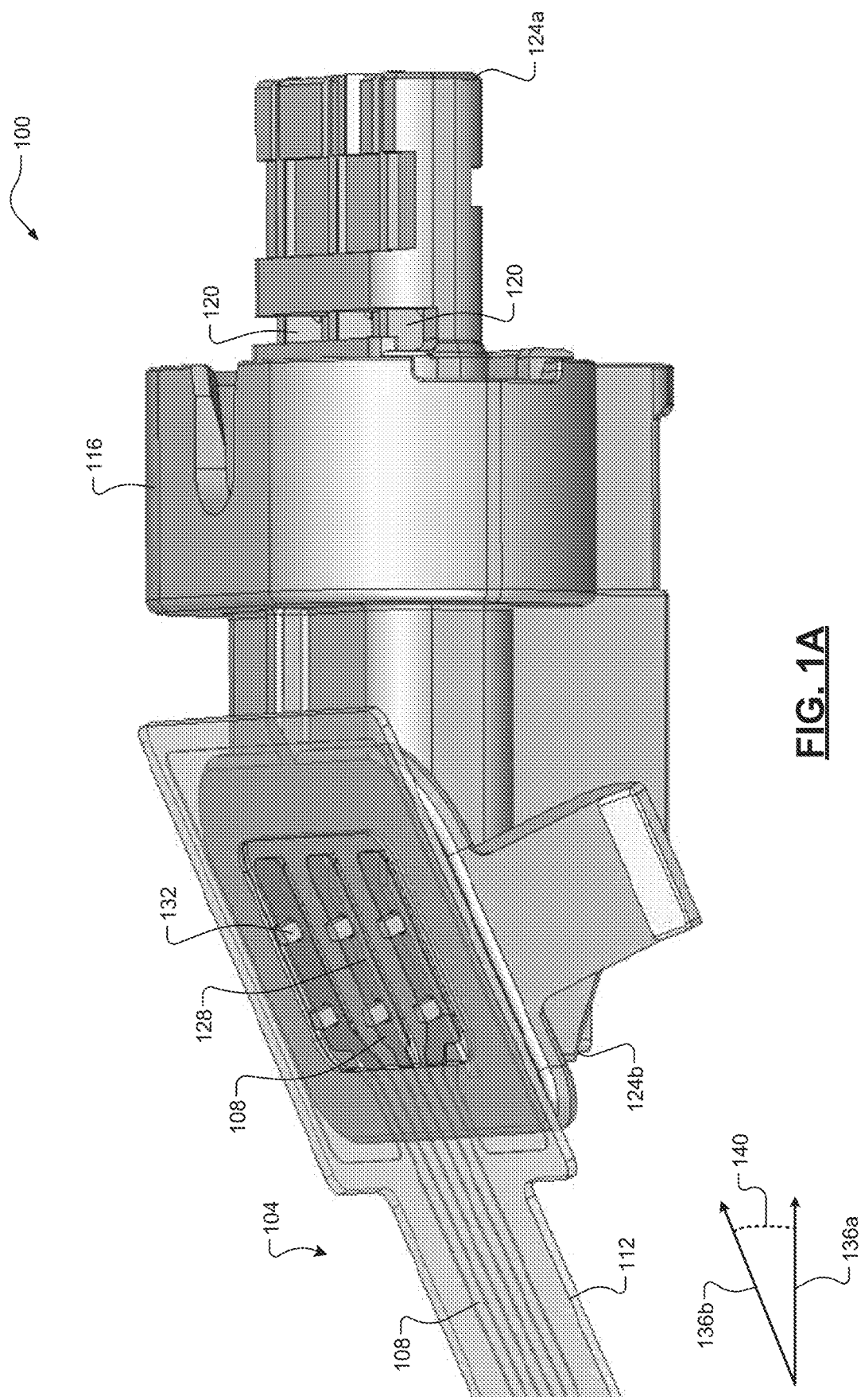
FIG. 1A illustrates a view of an example electrical connector for connecting an electrical system (e.g., round wire(s) or an electrical device) to exposed conductive circuit trace(s) of a flexible circuit (FC) according to some implementations of the present disclosure.
Figure 4:
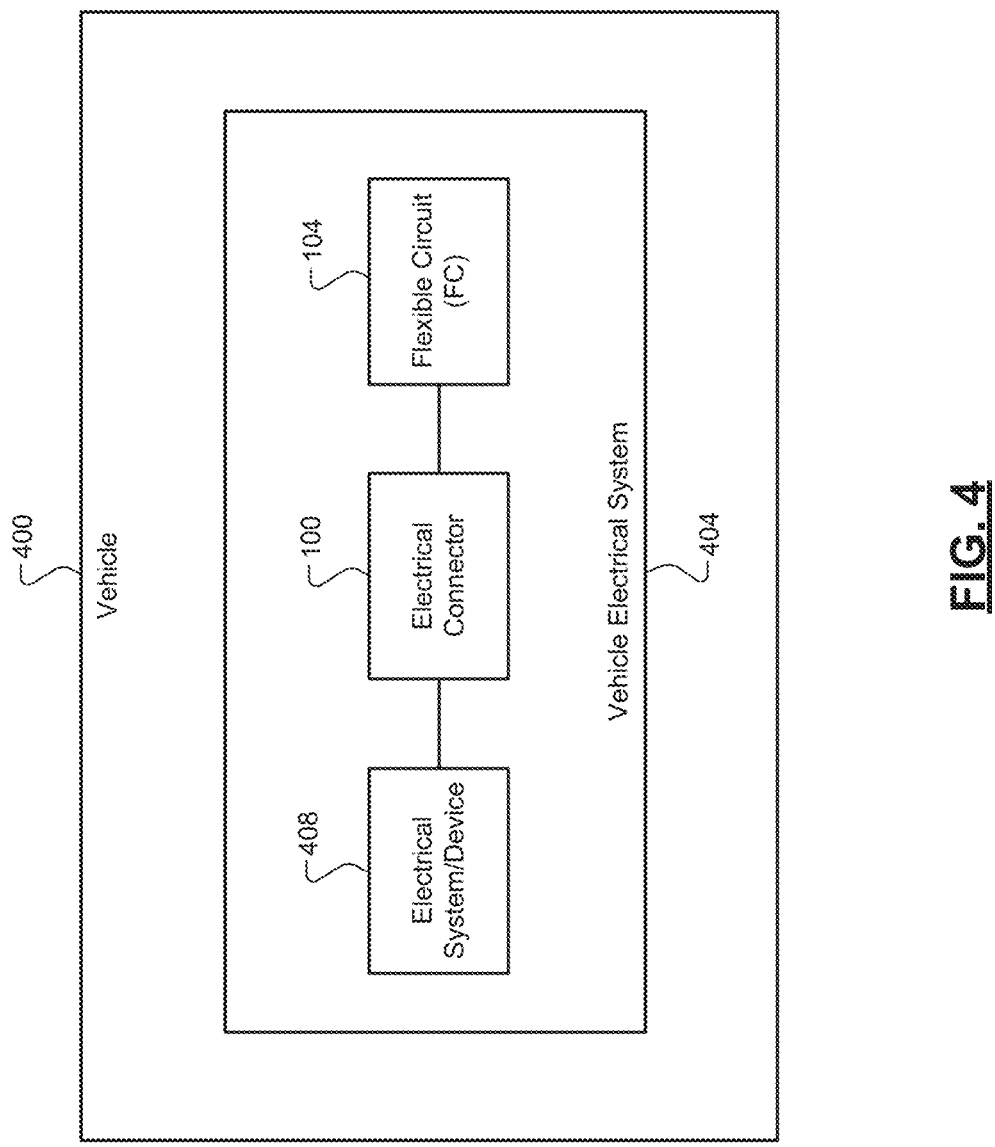
FIG. 4 illustrates a functional block diagram of an example vehicle having an example vehicle electrical system according to some implementations of the present disclosure.

Referring now to FIG. 1A and FIG. 4, a view of an example electrical connector 100 for connecting an electrical system/device 408 to an FC 104 and an example vehicle electrical system 404 of a vehicle 400 according to some implementations of the present disclosure are illustrated. The FC 104 comprises a set of (one or more) conductive circuit traces 108 disposed within an insulation layer 112. At least a portion of the insulation layer 112 is removed (e.g., via laser processing) to expose respective portions of the set of conductive circuit traces 108 (hereinafter, "set of exposed conductive circuit traces 108"). The electrical connector 104 generally comprises a housing 116 having a terminal 120 at least partially disposed therein. The terminal 120 defines a first end 124a and a second opposing end 124b. The terminal 120 is electrically connectable at its first end 124a to another electrical system/device 404. Non-limiting examples of the electrical system/device include a set of round wire(s) or a vehicle sensor/actuator, such as a RADAR/LIDAR sensor. The terminal 120 defines a set of angled blade terminals 128 at its second end 124b. Each angled blade terminal 128 is configured to electrically contact and connect to a respective exposed conductive circuit trace 108 as shown. These angled blade terminals 128 provide longer surfaces (i.e., greater surface area) for allowing simplified welding tooling access and improved welding repeatability.

Figure 1B:
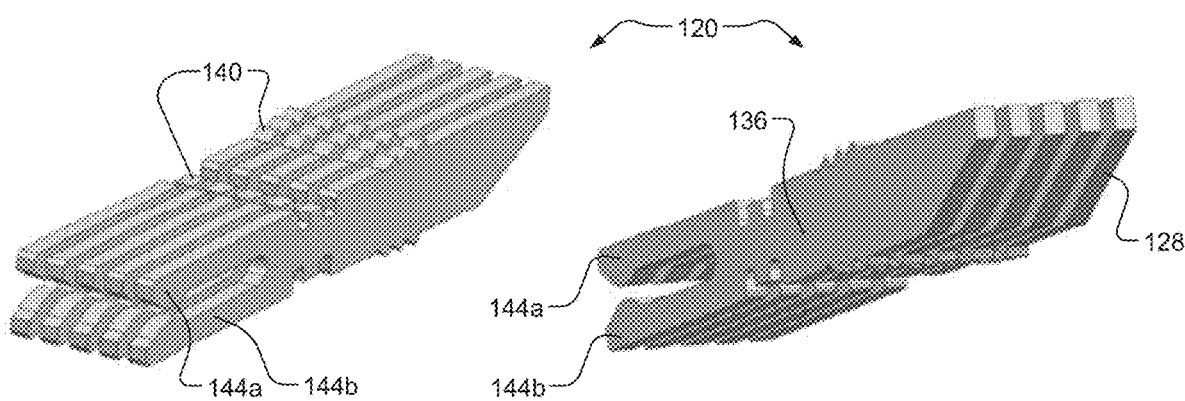
FIGS. 1B-1D illustrates example fork terminal configurations for the electrical connector of FIG. 1A according to some implementations of the present disclosure.
Figure 1C:
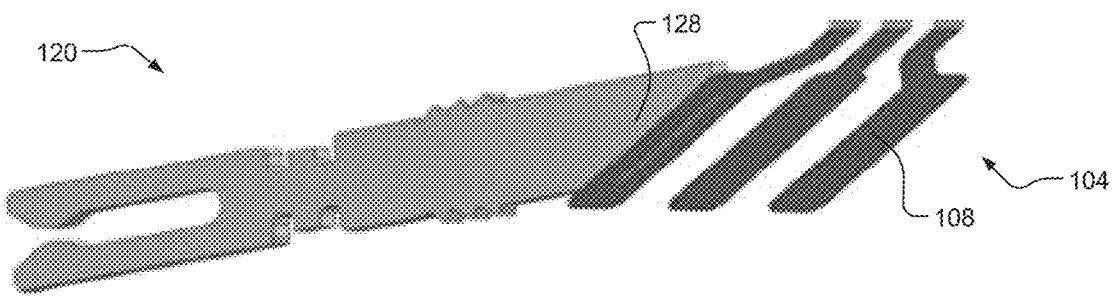
Figure 1D:
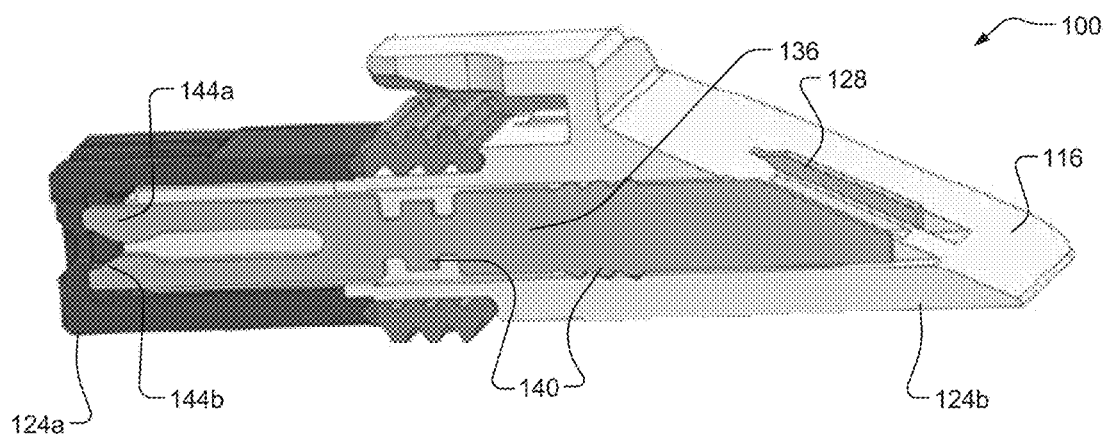

In some embodiments the terminal 120 is a tuning fork terminal as shown in FIGS. 1B-1D. In this configuration, the terminal 120 can generally include one or more (e.g., a plurality of) central portion(s) 136 having optional registration/alignment features 140 (e.g., ridges) between top and bottom gripping terminal members 144a, 144b at one end and the angled blade terminal member(s) 128 at another opposing end as shown in FIG. 1B. The top/bottom gripping terminal members 144a, 144b are configured to electrically connect to the other electrical system 404, such as clamping down on respective round wire(s) or other flat-wire conductors or a male blade terminal. In FIG. 1C, a specific electrical connection interaction between the angled blade terminal(s) 128 and the respective conductive circuit trace(s) 108 of the FC 104 is shown. Lastly, in FIG. 1D, an example cross-sectional view of the terminal 120 of FIGS. 1B-1C having been inserted within the housing 116 of the electrical connector 100 is illustrated. As shown, the terminal 120 has been registered/aligned within the housing 116 (e.g., via registration/alignment features 140) with the angled blade terminal(s) 128 proximate to the second end 124*b* and the top/bottom gripping terminal members 144*a*, 144*b* proximate to the opposing first end 124*a*. It will be appreciated that the configurations of FIGS. 1B-1C are merely example configurations of the terminal 120 and its disposal within the housing 116 and that other suitable configurations could be utilized and implemented.

In some implementations, each angled blade terminal 128 comprises one or more protrusions or "nibs" 132 of any suitable shape (rounded, squared, etc.) and configured for registering the position of the angled blade terminals 128 with the exposed conductive circuit traces 108. It will be appreciated that when a set of one or more nibs 132 is present, complimentary apertures are formed in the respective conductive circuit trace(s) 108 such that the nib(s) 132 are inserted therethrough. In one exemplary implementation, these nib(s) 132 are formed of a welding material such that, during a welding process (e.g., laser welding), a strong electrical connection can be made between the angled blade terminal(s) 128 and the exposed conductive circuit trace(s) 108. More specifically, more base material can be provided to improve welding repeatability. While the optional nib(s) 132 could be used for positioning/registration, it will be appreciated that feature(s) defined by the housing 116 (e.g., a notch and a cap with a clip) could be used instead or in addition to the nib(s) 132 for positioning/registration as discussed in greater detail below. As shown, the first end 124*a* of the terminal 120 is generally arranged along a first axis 136*a* whereas the angled blade terminal(s) 128 of the terminal 120 are generally arranged along a second axis 136*b*, collectively defining an acute angle 140 therebetween to provide for a low-profile connection/installation arrangement for reduced packaging/size. The angled blade terminal(s) 128 also provide for greater surface areas for electrical connection with the exposed conductive circuit traces 108 compared to the above-described conventional perpendicular (e.g., top-down) electrical connection systems/methods.

Figure 2A:
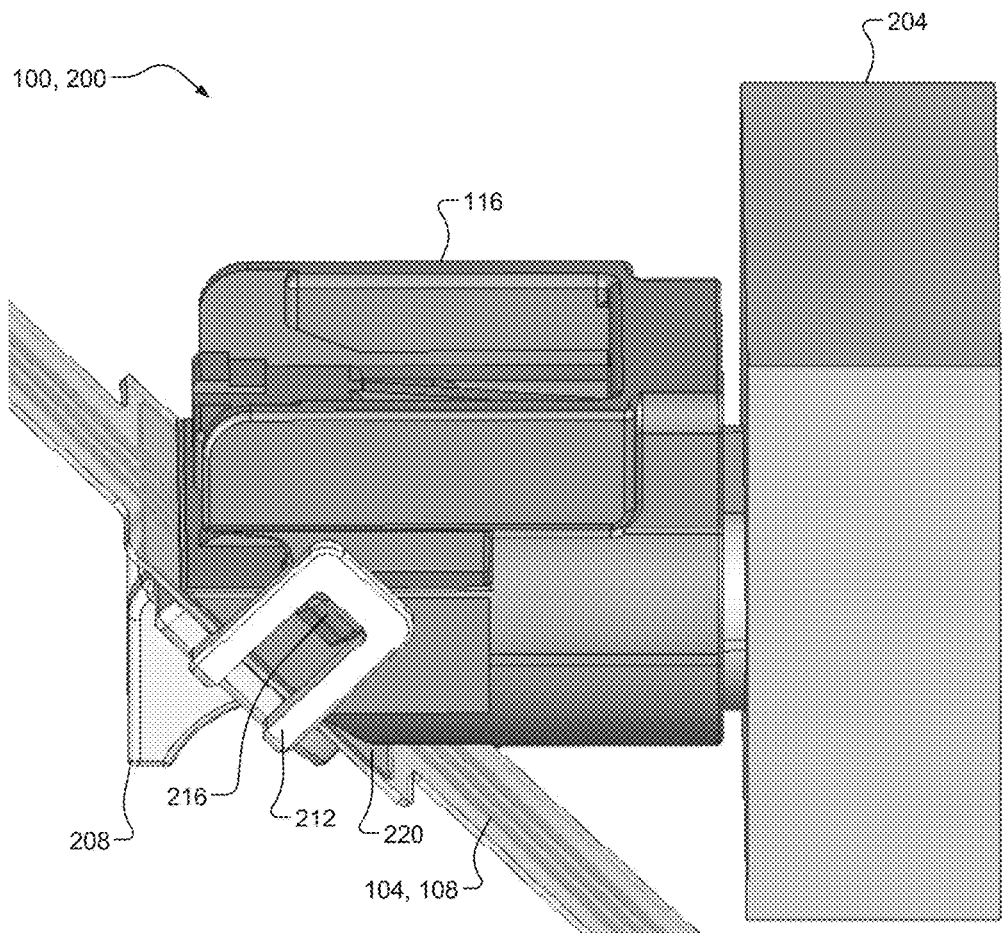
FIGS. 2A-2B illustrate views of the example electrical connector of FIG. 1A electrically connected to two different example electrical systems and to the exposed conductive circuit trace(s) according to some implementations of the present disclosure.
Figure 2B:
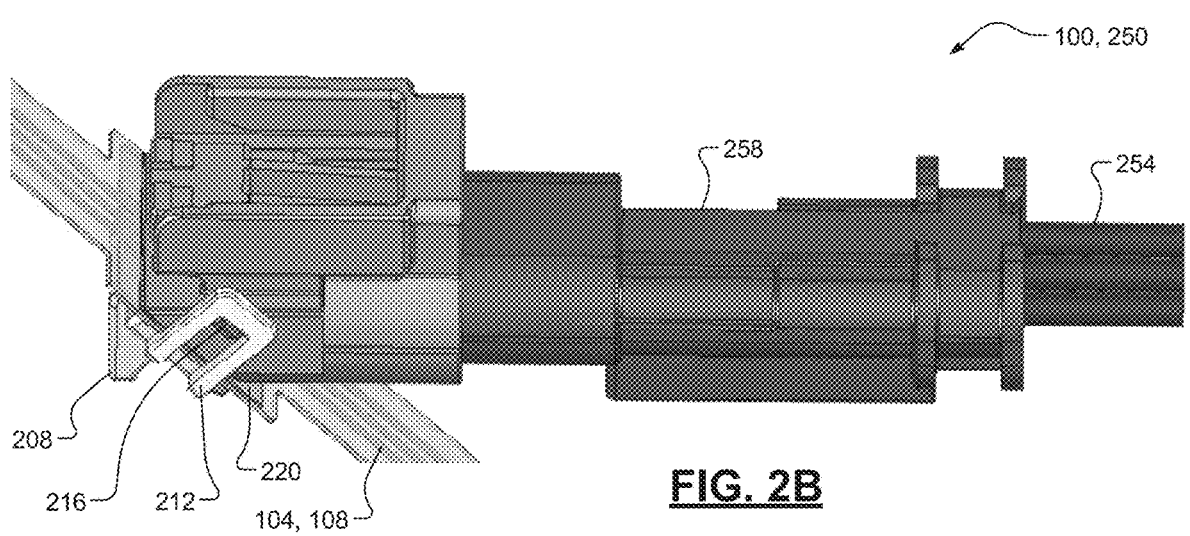

Referring now to FIGS. 2A-2B and with continued reference to FIGS. 1 and 4, views 200, 250 of the example electrical connector 100 electrically connected to two different example electrical systems 204, 254 and to the set of exposed conductive circuit trace(s) 108 according to some implementations of the present disclosure are illustrated. In FIG. 2A, electrical system/device 204 is directly electrically connected to the first end 124*a* of the terminal 120. In some implementations, a cap member 208 is provided to secure, via a notch 212 and a clip 216, the FC 104 against the angled blade terminal(s) 128 of the terminal 120. An optional seal 220 (an adhesive pad, a silicone seal, combinations thereof, etc.) can also be provided therebetween to provide a sealed electrical connection (e.g., moisture-free). The larger angled surface also allows for wider seal surfaces in an overall shorter connector height package. In FIG. 2B, a set of (one or more) round wires 254 are electrically connected to the first end 124*a* of the terminal 120. Similar to FIG. 2A, the cap member 208 can be provided to secure, via the notch 212 and the clip 216, the FC 104 against the angled blade terminal(s) 128 of the terminal 120 and an optional seal 220 can also be provided therebetween to provide a sealed electrical connection.

Figure 3:
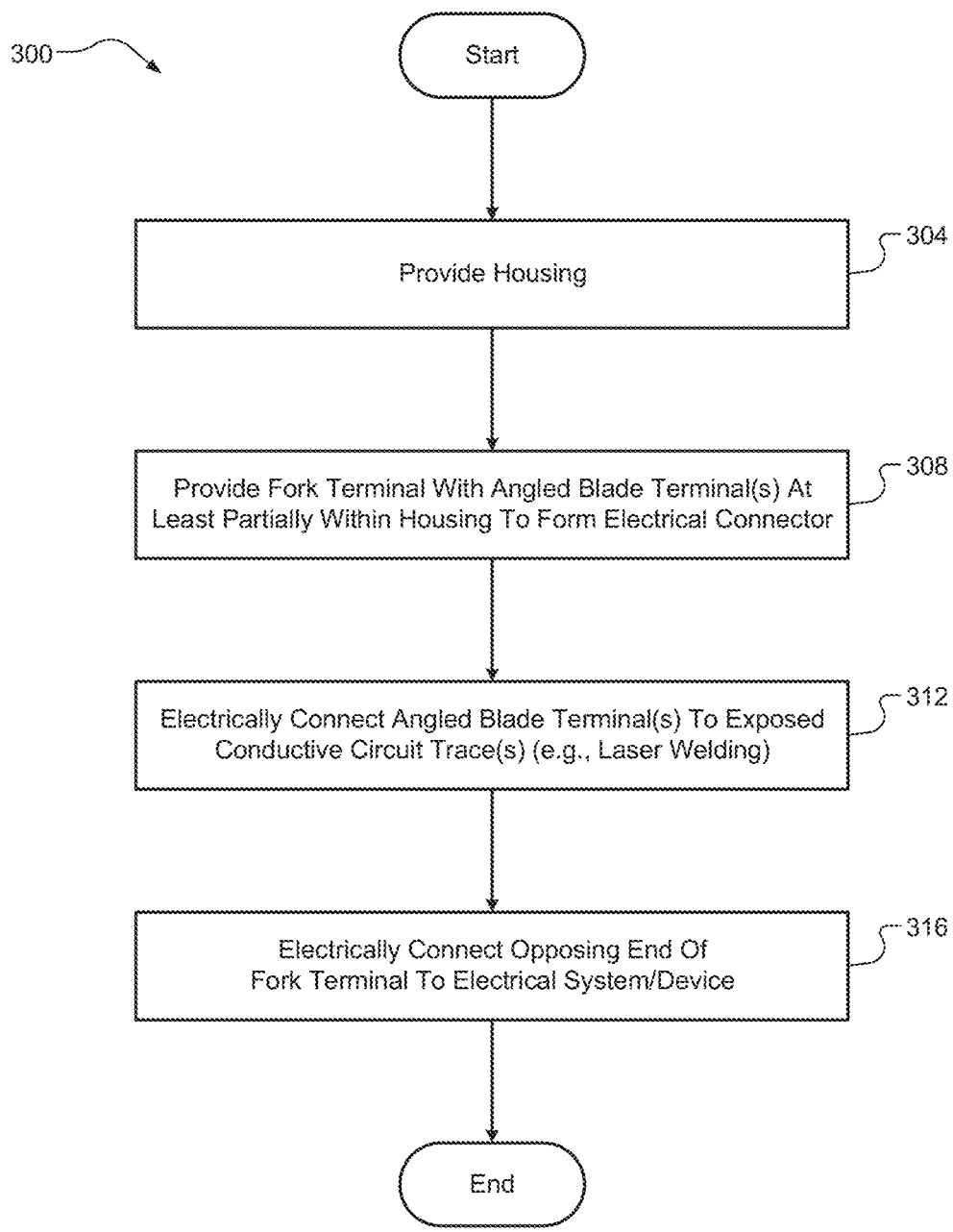
FIG. 3 illustrates a flow diagram of an example method of forming an electrical connection between an electrical system and exposed conductive circuit trace(s) of an FC according to some implementations of the present disclosure.

FIG. 3 illustrates a flow diagram of an example method 300 of forming an electrical connection between an electrical system and exposed conductive circuit trace(s) of an FC according to some implementations of the present disclosure is illustrated. While the components of FIGS. 1, 2A-2B, and 4 are specifically referenced, it will be appreciated that this method 300 could be applicable to the formation and electrical connection of any suitable electrical system. At 304, the housing 116 is provided. At 308, the terminal 120 having the angled blade terminal(s) 128 is provided and arranged at least partially within the housing 116. At 312, the angled blade terminal(s) 128 are electrically connected to the respective exposed conductive circuit trace(s) 108, such as via a welding process. In one exemplary implementation, this welding process is a laser welding process to provide a strong electrical connection therebetween and, as previously discussed, the nib(s) 132 could be formed of a welding material that is utilized during this laser welding process. Lastly, at 316, the terminal 120 is electrically connected (at its first end 124*a*) to another electrical system/device 404, such as a vehicle sensor/actuator. The method 300 then ends or returns to 304. It will be appreciated that the various steps described herein could be performed by a human installer, a robotic installer, or some combination thereof. For example, the laser welding could be performed by a human installer, and then the remaining steps of installing the electrical components (e.g., within a vehicle electrical system) could be performed by a robotic installer.

Figure 5A:
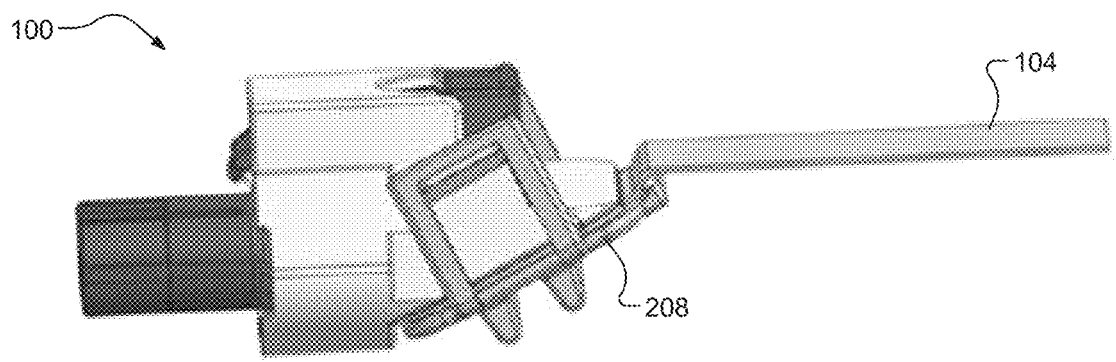
FIGS. 5A-5J illustrate alternative embodiments or features of an example electrical connector for connecting an electrical system to exposed conductive circuit traces of an FC according to some implementations of the present disclosure.
Figure 5B:
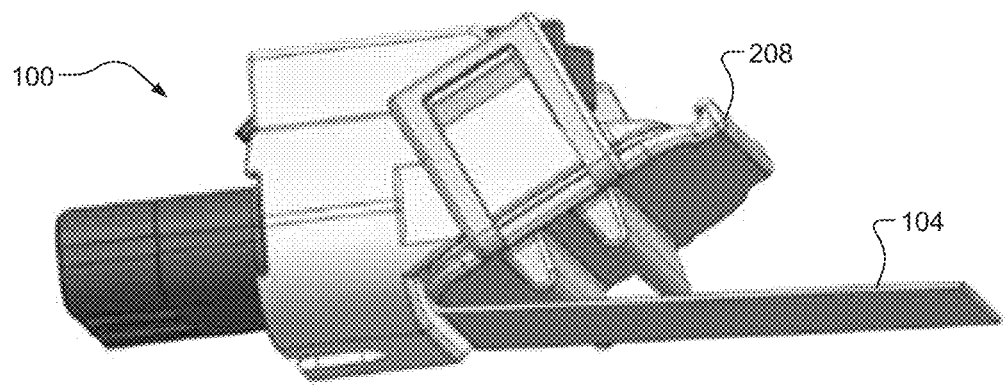
Figure 5C:
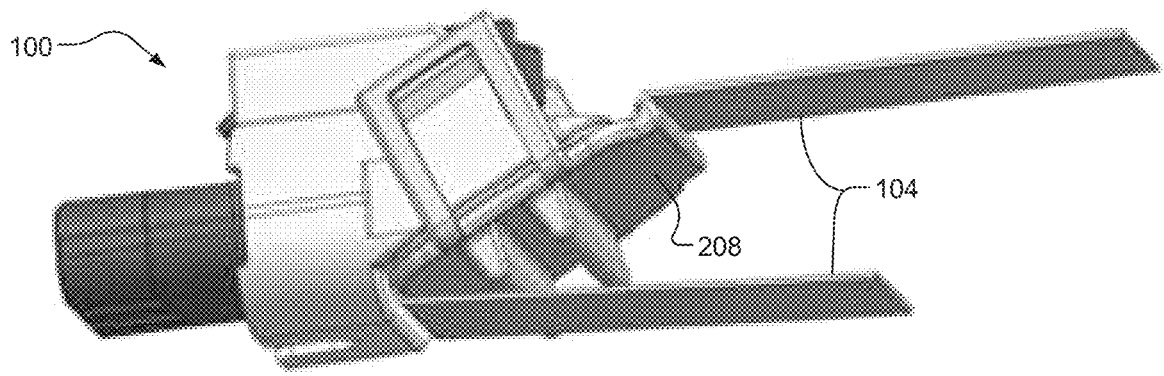
Figure 5D:
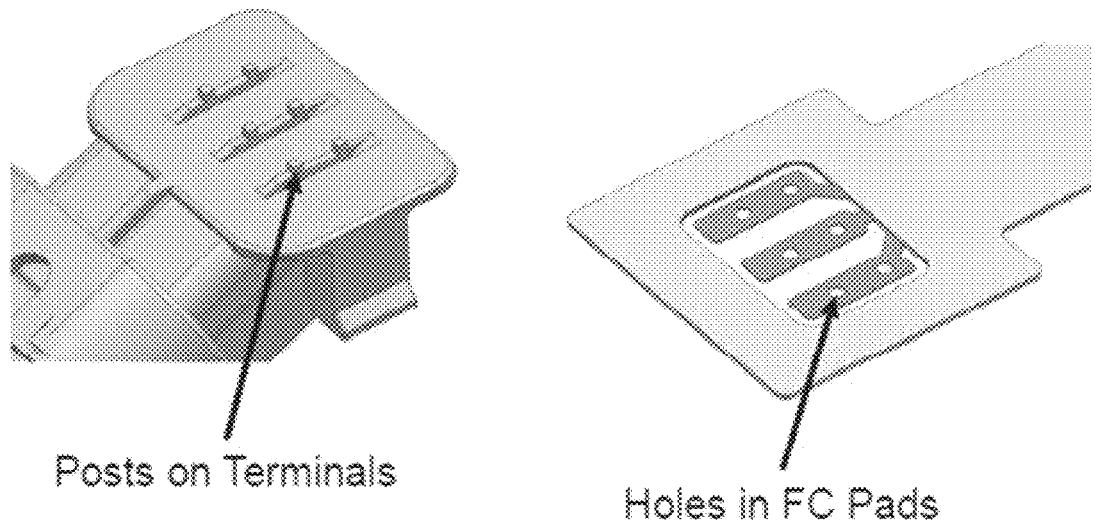
Figure 5E:
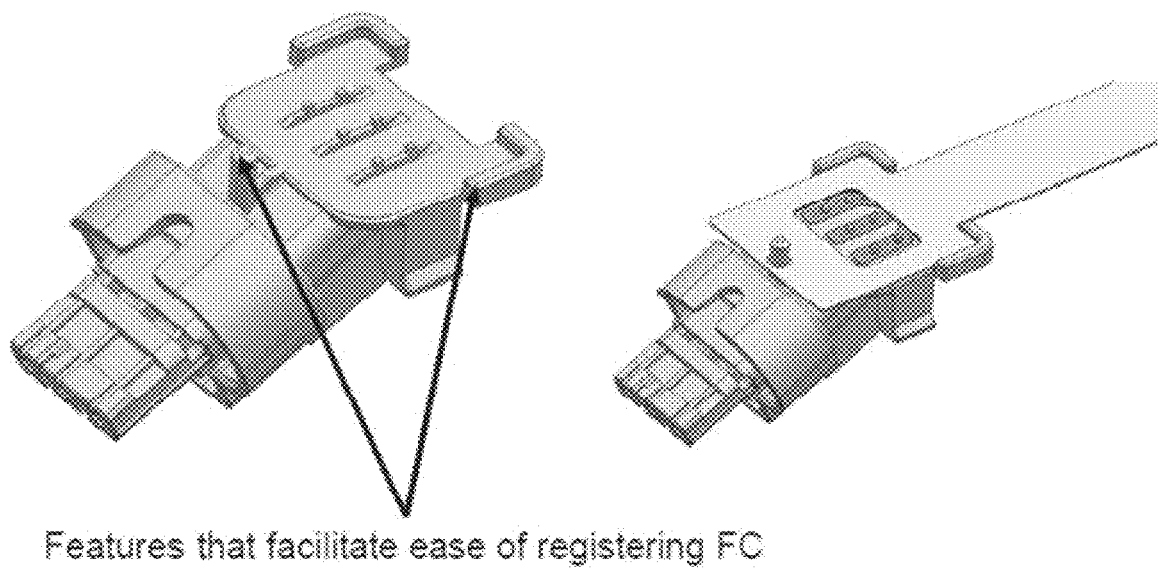
Figure 5F:
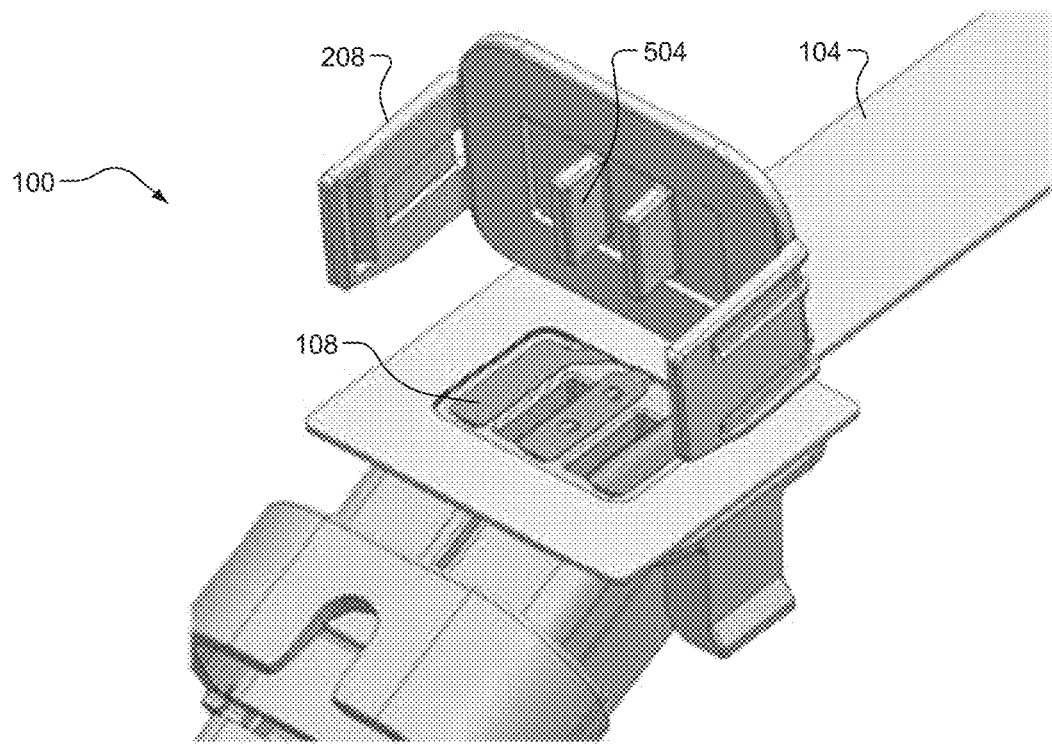
Figure 5G:
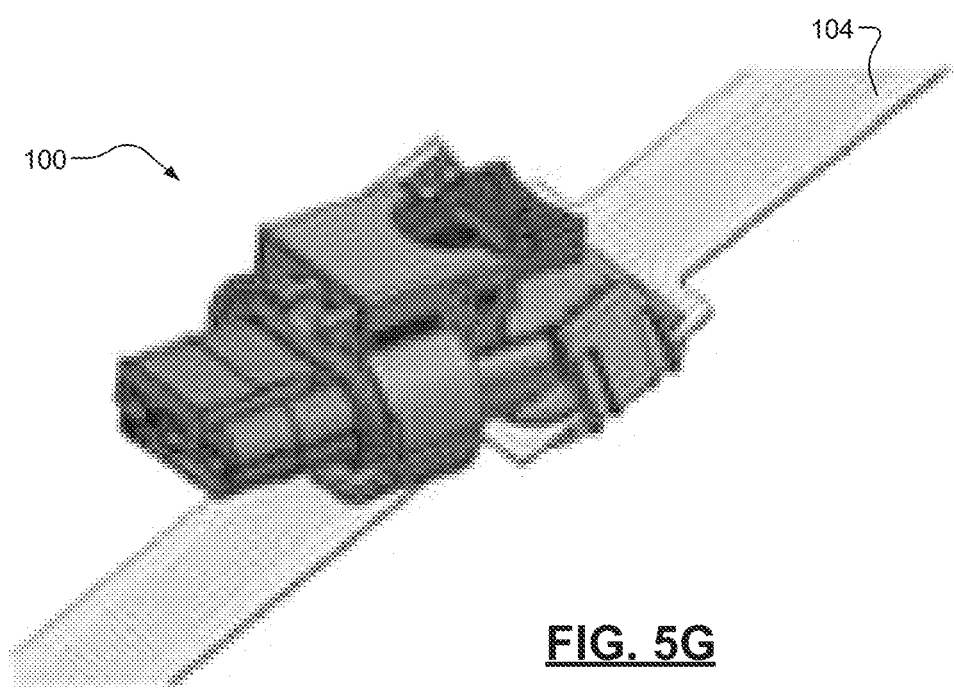
Figure 5H:
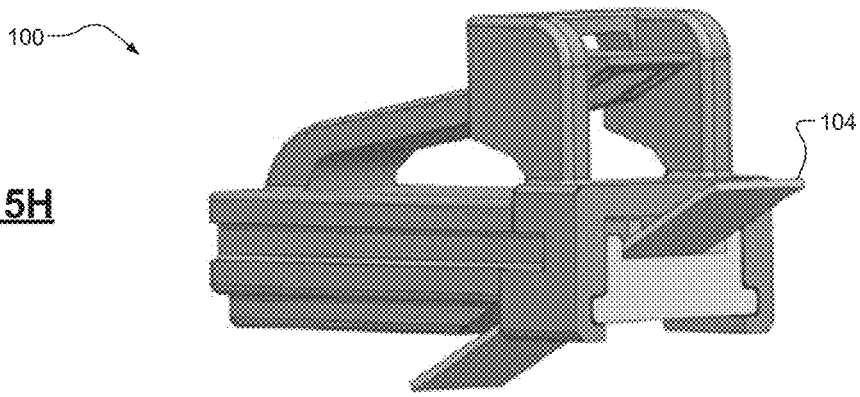
Figure 5I:
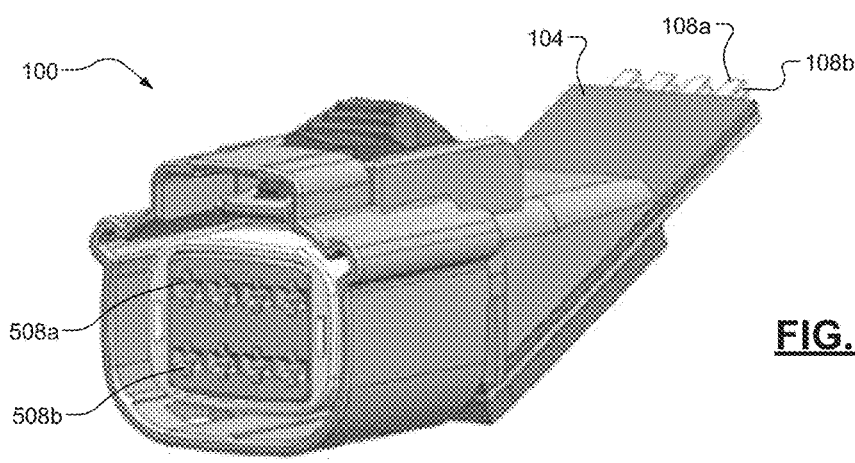
Figure 5J:
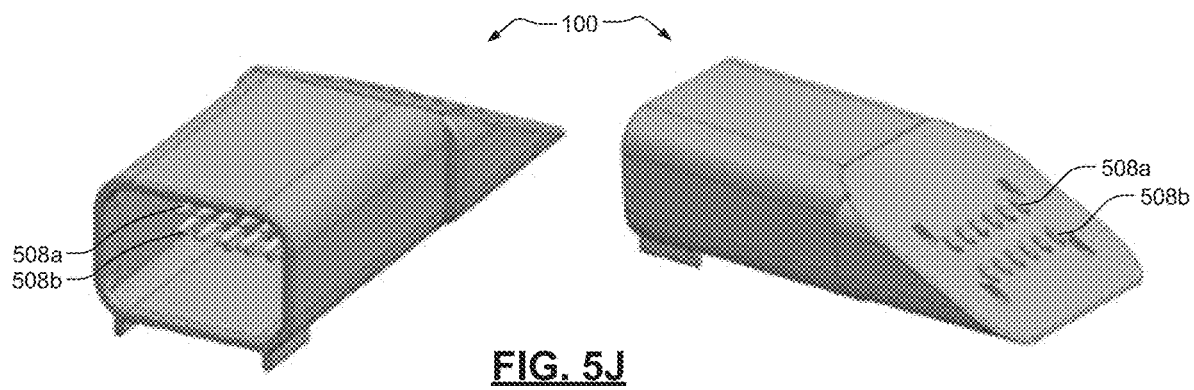

Referring now to FIGS. 5A-5J and with continued reference to the previous FIGS., alternative embodiments or features of the example electrical connector 100 for connecting an electrical system 404 to exposed conductive circuit traces 108 of an FC 104 according to some implementations of the present disclosure are illustrated. As shown in FIGS. 5A-5C, the FC 104 can be dressed or connected above (FIG. 5A), below (FIG. 5B), or above and below (FIG. 5C) the angled surface. In the embodiment of FIG. 5C, one or both of the connections to the FC 104 could be sealed (e.g., using cap 208 and a respective sealing member). The retainer cap 208 could optionally provide for the FC 104 to be bent over rounded edges of the cap 208 to provide strain relief thereby preventing the FC 104 from shearing away from the connection. FIGS. 5D-5E further illustrate the terminal posts or nibs 132 and the corresponding holes/apertures in the conductive traces 108 of the FC 104, in addition to optional housing features (e.g., rounded edge members) that could further facilitate the ease of registering the FC 104 (e.g., when the FC 104 has a wider portion that contacts the angled surface as shown). In FIG. 5F, the cap 208 may require features 504 that separate FC conductive traces 108. While the connector 100 is generally shown and described herein to be parallel to or substantially parallel to a longitudinal axis of the FC 104, it will be appreciated that the connector 100 could be configured to an angled connection relative to the longitudinal axis of the FC 104 as shown in FIG. 5G. As previously mentioned, the sealing feature is optional and the connector 100 could provide for an unsealed connection (see FIG. 5H), which could be ideal for less expensive implementations where sealing is not necessary. In yet other embodiments, the connector 100 could provide for two separate (e.g., stacked) connections 508*a*, 508*b*, such as to two separate sets of conductive traces 108*a*, 108*b* of the same FC 104 or another FC as shown in FIG. 5I. FIG. 5J further illustrates a similar embodiment of FIG. 5I having an opposing male/female connection configuration.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrical connector, comprising:
    a housing; and
    a terminal at least partially disposed in the housing, defining a set of angled blade terminals, and configured to electrically connect to (i) an electrical system along a first axis and (ii) a set of exposed conductive circuit traces of a flexible substrate (FC) arranged along a second axis, wherein an acute angle is defined between the first and second axes and corresponds to the set of angled blade terminals.

2. The electrical connector of claim 1, wherein each angled blade terminal defines a larger surface area for electrical contact with a respective exposed conductive circuit trace compared to a perpendicular connection.

3. The electrical connector of claim 1, wherein the acute angle provides for a low-profile installation arrangement of the electrical system, the electrical connector, and the FC.

4. The electrical connector of claim 1, wherein the electrical system is a set of round wires or an electrical device comprising the set of round wires.

5. The electrical connector of claim 1, wherein the electrical system, the electrical connector, and the FC are all part of a vehicle electrical system.

6. The electrical connector of claim 1, wherein:
    the housing includes a first surface extending in a direction parallel to the first axis and defining an aperture; and
    a blade terminal of the set of blade terminals is disposed within the aperture and includes a second surface extending in the direction parallel to the second axis.

7. The electrical connector of claim 1, wherein the set of angled blade terminals are welded to the set of exposed conductive circuit traces via a welding process to form the electrical connection therebetween.

8. The electrical connector of claim 7, wherein the welding process is laser welding.

9. The electrical connector of claim 7, wherein each angled blade terminal comprises a set of nibs that electrically contact a respective exposed conductive circuit trace.

10. The electrical connector of claim 9, wherein the sets of nibs are formed of a welding material utilized in the welding process.

11. An electrical connection method, comprising:
    providing a housing;
    providing a terminal at least partially disposed in the housing, the terminal defining a set of angled blade terminals and being configured to electrically connect to (i) an electrical system along a first axis and (ii) a set of exposed conductive circuit traces of a flexible substrate (FC) arranged along a second axis, wherein an acute angle is defined between the first and second axes and corresponds to the set of angled blade terminals;
    electrically connecting the set of angled blade terminals to the set of exposed conductive circuit traces of the FC; and
    electrically connecting an opposing end of the terminal to the electrical system.

12. The method of claim 11, wherein each angled blade terminal defines a larger surface area for electrical contact with a respective exposed conductive circuit trace compared to a perpendicular connection.

13. The method of claim 11, wherein the acute angle provides for a low-profile installation arrangement of the electrical system, the housing, and the FC.

14. The method of claim 11, wherein the electrical system is a set of round wires or an electrical device comprising the set of round wires.

15. The method of claim 11, wherein the electrical system, the housing, and the FC are all part of a vehicle electrical system.

16. The method of claim 11, wherein electrically connecting the set of angled blade terminals to the set of exposed conductive circuit traces comprises welding the set of angled blade terminals to the set of exposed conductive circuit traces via a welding process to form the electrical connection therebetween.

17. The method of claim 16, wherein the welding process is laser welding.

18. The method of claim 16, wherein each angled blade terminal comprises a set of nibs that electrically contact a respective exposed conductive circuit trace.

19. The method of claim 18, wherein the sets of nibs are formed of a welding material utilized in the welding process.

20. An electrical system of a vehicle, the electrical system comprising:
   an electrical device having a set of three round wires arranged along a first axis;
   a flexible substrate (FC) arranged along a second axis and comprising a set of conductive circuit traces disposed within an insulation layer, wherein at least a portion of the insulation layer has been removed thereby providing a set of exposed conductive circuit traces; and
   a terminal at least partially disposed in a housing, defining a first and a second opposing end forming a set of angled blade terminals, and configured to electrically connect to the set of three round wires of the electrical device and the set of exposed conductive circuit traces of the FC, wherein an acute angle is defined between the first and second axes and corresponds to the set of angled blade terminals.

21. The electrical system of claim 20, wherein the electrical device is a vehicle sensor or actuator and wherein the set of three round wires correspond to ground, power, and signal.

* * * * *